(12) United States Patent
Jeffs et al.

(10) Patent No.: US 10,961,716 B2
(45) Date of Patent: Mar. 30, 2021

(54) VEHICLE APPARATUS FOR USE ON A ROOF AND METHOD OF ASSEMBLING AND INSTALLING COMMERCIAL ROOFING

(71) Applicant: Innovatech, LLC, Kanarraville, UT (US)

(72) Inventors: Brig Jeffs, New Harmony, UT (US); Edson Harker, Colorado City, AZ (US); James Barlow, Colorado City, AZ (US); James Harker, Colorado City, UT (US); Nathan Jessop, Hildale, UT (US); Sam Williams, Colorado City, AZ (US); Thomas Harker, Hurricane, UT (US)

(73) Assignee: Innovatech, LLC, Kanarraville, UT (US)

( * ) Notice: Subject to any disclaimer, the term of this patent is extended or adjusted under 35 U.S.C. 154(b) by 0 days.

(21) Appl. No.: 16/909,878

(22) Filed: Jun. 23, 2020

(65) Prior Publication Data

US 2020/0318355 A1   Oct. 8, 2020

Related U.S. Application Data

(63) Continuation of application No. 15/813,123, filed on Nov. 14, 2017, now Pat. No. 10,689,856.

(Continued)

(51) Int. Cl.
*E04D 15/04* (2006.01)
*B60R 11/06* (2006.01)

(Continued)

(52) U.S. Cl.
CPC .............. *E04D 15/04* (2013.01); *B60L 50/50* (2019.02); *B60R 11/06* (2013.01); *B62D 21/18* (2013.01);

(Continued)

(58) Field of Classification Search
CPC ......... E04D 15/00; E04D 15/02; E04D 15/04; E04D 15/042; B60Y 2200/49;

(Continued)

(56) References Cited

U.S. PATENT DOCUMENTS 2,231,560 A * 2/1941 Campion ................... E04G 3/26
                                                        105/157.1
2,814,533 A * 11/1957 Van Horn ................. E04G 3/26
                                                        182/14

(Continued)

*Primary Examiner* — Paul N Dickson
*Assistant Examiner* — Timothy Wilhelm
(74) *Attorney, Agent, or Firm* — Gurr Brande & Spendlove, PLLC; Robert A. Gurr (57) ABSTRACT

A roof vehicle has a chassis, a plurality of motor-driven wheels coupled to the chassis, a man-basket coupled to the chassis, wherein the man-basket is moveable on a y-axis and is configured to lower to an elevation beneath that of the plurality of motor-driven wheels, a deck for transporting equipment, and a power supply. A method for assembling and installing a roof involves moving the roof vehicle to the desired location on the roof of a structure, lowering the man-basket at least partially beneath the surface roof, and performing work (e.g., welding) to secure the roof to the structure of the building.

5 Claims, 11 Drawing Sheets

Related U.S. Application Data (60) Provisional application No. 62/550,855, filed on Aug. 28, 2017, provisional application No. 62/421,448, filed on Nov. 14, 2016.

(51) Int. Cl.
*E04D 15/00* (2006.01)
*B60L 50/50* (2019.01)
*B62D 21/18* (2006.01)

(52) U.S. Cl.
CPC .......... *E04D 15/00* (2013.01); *B60L 2200/40* (2013.01); *B60Y 2200/49* (2013.01); *E04D 2015/042* (2013.01)

(58) Field of Classification Search
CPC ....... B60Y 2200/60; B66F 11/04; A62B 1/00; A62B 1/02; E04G 3/26
See application file for complete search history.

(56) References Cited

U.S. PATENT DOCUMENTS

| | | | | |
|---|---|---|---|---|
| 3,398,806 A * | 8/1968 | Hendricks | | E04D 15/00 180/9.1 |
| 3,410,428 A * | 11/1968 | Pat Maher | | E04F 21/1822 414/523 |
| 3,424,272 A * | 1/1969 | Cousins | | B66F 11/04 182/16 |
| 3,464,516 A * | 9/1969 | Remele | | E06C 1/56 182/73 |
| 3,865,203 A * | 2/1975 | Hibma | | E04G 1/24 180/2.1 |
| 4,068,446 A * | 1/1978 | Brueske | | E04D 15/00 182/45 |
| 4,195,694 A * | 4/1980 | Gizzarelli, Sr. | | A62B 1/00 169/53 |
| 4,257,652 A * | 3/1981 | Edwards | | B62D 55/07 180/9.48 |
| 4,434,869 A * | 3/1984 | Roop | | A62B 1/02 182/10 |
| 4,614,251 A * | 9/1986 | Hawkins | | B66F 7/0625 182/141 |
| 4,641,757 A * | 2/1987 | Rosendale | | B66C 9/00 104/182 |
| 4,934,629 A * | 6/1990 | Brant | | A62B 1/02 169/53 |
| 4,995,774 A * | 2/1991 | Nusbaum | | B62D 7/026 180/234 |
| 5,378,302 A * | 1/1995 | Meister | | B29C 66/1122 156/497 |
| 6,024,147 A * | 2/2000 | Hunter, Jr. | | B05B 13/005 118/323 |
| 6,102,157 A * | 8/2000 | Goldbach | | B05B 13/005 182/128 |
| 6,126,766 A * | 10/2000 | Hunter, Jr. | | B05B 13/005 156/166 |
| 6,889,798 B2 * | 5/2005 | Overby | | A62B 1/02 182/127 |
| 7,213,715 B2 * | 5/2007 | Boily | | A62B 1/08 212/179 |
| 7,277,782 B2 * | 10/2007 | Yakes | | B60K 6/46 701/22 |
| 7,493,737 B2 * | 2/2009 | Smith | | E04D 15/00 182/45 |
| 7,597,175 B2 * | 10/2009 | Reed | | A62B 1/02 182/142 |
| 7,874,451 B2 * | 1/2011 | Bel | | E04D 15/00 220/628 |
| 8,056,677 B1 * | 11/2011 | Roberts | | A01D 46/20 182/148 |
| 8,360,203 B2 * | 1/2013 | Waisanen | | B66C 17/06 182/141 |
| 8,490,746 B2 * | 7/2013 | Cummings | | B66F 11/04 182/2.2 |
| 8,627,797 B2 * | 1/2014 | Renner | | B60P 3/14 123/179.4 |
| 8,651,236 B2 * | 2/2014 | Bowden | | B66F 17/006 182/113 |
| 9,133,632 B2 * | 9/2015 | Patron | | E04G 1/20 |
| 9,163,409 B2 * | 10/2015 | Hardin, III | | B29C 65/10 |
| 9,358,836 B2 * | 6/2016 | David | | B60B 35/1054 |
| 9,409,755 B2 * | 8/2016 | Melton | | B66F 11/04 |
| 10,029,899 B2 * | 7/2018 | Hao | | B66F 17/006 |
| 10,287,150 B1 * | 5/2019 | Miller | | E01D 21/00 |
| 2009/0096231 A1 * | 4/2009 | Burlingame | | B66F 11/04 294/68.3 |
| 2010/0018722 A1 * | 1/2010 | Phillips | | A62C 3/02 169/37 |
| 2012/0051879 A1 * | 3/2012 | Davis | | B66F 11/04 414/729 |
| 2012/0265388 A1 * | 10/2012 | Bissontz | | B60L 1/003 701/22 |
| 2013/0228396 A1 * | 9/2013 | Cummings | | B66F 11/04 182/129 |
| 2015/0098775 A1 * | 4/2015 | Razumov | | B65G 1/0464 414/282 |
| 2016/0069094 A1 * | 3/2016 | Lombardi | | B66F 11/046 182/150 |
| 2016/0083969 A1 * | 3/2016 | Arnold | | E04G 1/15 182/45 |
| 2016/0311253 A1 * | 10/2016 | Palmer | | B60B 3/16 |
| 2016/0339277 A1 * | 11/2016 | Angelopoulos | | B63B 57/00 |
| 2018/0135306 A1 * | 5/2018 | Jeffs | | B60L 50/50 |
| 2018/0194603 A1 * | 7/2018 | Roster | | B66F 11/046 |
| 2018/0215597 A1 * | 8/2018 | Linsmeier | | A62C 27/00 |
| 2018/0305187 A1 * | 10/2018 | Kosterke | | B66B 5/14 |
| 2019/0077645 A1 * | 3/2019 | Conway | | B66F 17/006 |
| 2020/0230004 A1 * | 7/2020 | Kailasuo | | A61G 7/1019 |

* cited by examiner

VEHICLE APPARATUS FOR USE ON A ROOF AND METHOD OF ASSEMBLING AND INSTALLING COMMERCIAL ROOFING

CROSS-REFERENCE TO RELATED APPLICATIONS

This application is a continuation of U.S. patent application Ser. No. 15/813,123 filed on Nov. 14, 2017, which claims the benefit of U.S. Provisional Application Ser. No. 62/421,448 filed on Nov. 14, 2016 and U.S. Provisional Application Ser. No. 62/550,855, filed on Aug. 28, 2017, all of which are incorporated herein by reference.

TECHNICAL FIELD

The present disclosure relates to commercial construction. More particularly, the present disclosure relates to a vehicle apparatus for traversing a roof to aid in the assembly and installation of the roof.

BACKGROUND

Building construction is an inherently dangerous activity. Heavy materials, large equipment, and heights all create added risk. This is particularly true for the roofing industry. When installing roofing, it is not uncommon to have many workers on the roof level, usually at dangerous heights, interacting with dangerous tools, machinery, and other components. The more workers on the roof, the higher the odds of an accident. In an effort to reduce these risks, safety measures have been implemented for those workers on the roof. Such measures include safety harnesses, but while the risk is lowered, accidents still occur. Further, such safety measures slow the process of roof installation, as each construction worker on the roof must ensure that the appropriate safety measures are completed.

When finishing a roof, the roof panels and portions must be secured to the building structure, which often occurs through welding. However, when a roof is almost completed, it becomes more difficult for workers to access locations where the roof will be joined to the building structure, usually at joints of building joists. This process leads to more risk for workers and generally takes longer because of the limited space available to the workers. Further, it is difficult for workers to move all of the equipment safely along the roof as they proceed from joint to joint, and are at risk as they must descend under the roof to weld-stitch the joints of the joists. In the alternative, if the worker is not lowered to perform the weld, the worker may be hoisted to perform the welding. However, this necessarily puts the worker at great heights, where there is significant risk of accident.

Therefore, there remains a need for a system that allows construction workers to move from joint to joint in a fast, efficient, and safe manner, and that further allows a worker to safely descend and perform welding tasks. The present invention seeks to solve these and other problems.

SUMMARY OF EXAMPLE EMBODIMENTS

In one embodiment, a roof vehicle comprises a chassis, a plurality of motor-driven wheels coupled to the chassis, a man-basket coupled to the chassis, wherein the man-basket is moveable on a y-axis and is configured to lower, at least partially, to an elevation beneath that of the plurality of motor-driven wheels, a deck for transporting equipment, and a power supply.

In one embodiment, a method for assembling and installing a roof comprises moving the roof vehicle to the desired location on the roof of a structure, lowering the man-basket beneath the roof, and performing work (e.g., welding) to secure the roof to the structure of the building.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As will be appreciated, the roof vehicle described herein solves the need for a system and/or method that allows construction workers to move from joist joint to joist joint in a fast, efficient, and safe manner, and that further allows a worker to safely descend and secure the roof to the underlying structure, such as by weld-stitching at the joist joints. In one embodiment, as illustrated in FIGS. 1-9 a roof vehicle 100 comprises a chassis 101 coupled to four motor-driven wheels 102, two guide wheels 111, and a safety railing 104 which extends around the circumference of the chassis 11. The chassis 101 may further comprise a deck 115 which allows for storage of equipment and passengers. The safety railing 104 reduces risk that passengers or equipment will fall therefrom. A gate 116 allows users to enter and exit the deck 115. The safety railing 104 may also have one or more storage compartments 118, 119 removably attached thereto. The two storage compartments 118, 119 near a power generator 120 may be used to house one or more power inverters and other electrical components for engaging the wheels 102 for movement or steering, and/or for powering the welding equipment. Compartment 117 may comprise a wire feed or other welding equipment. Accordingly, the roof vehicle 100 further comprises a steering wheel 110, an actuator pedal 112, and a brake pedal 114. Guide wheels 111 allow a user to easily stay on track (e.g., remain in roof corrugations) and prevent the roof vehicle 100 from misalignment. The roof vehicle 100 further comprises a man-basket 106 at one end of the chassis 101, which contains a control panel 108, wherein a user is able to lower and raise the man-basket 106 along the y-axis while standing inside of it. Particularly, the man-basket 106 is at least partially lowerable to an elevation beneath that of the wheels 102. Upper frame 107 may provide stability and guidance for the man-basket 107. The upper frame 107 may be hinged so that it may be collapsed during transportation. Further, the control panel 108 may also allow the workman to drive the roof vehicle 100 to the next welding area. In other words, the roof vehicle 100 may be powered and driven from the man-basket 106 so that a single user may maneuver the roof vehicle 100 to complete work. FIGS. 6-9 illustrate the man-basket 106 lowered beneath the elevation of the wheels 102. In other words, a user is capable of being lowered in the man-basket 106 to an elevation lower than the wheels 102 so that the user may weld the roof, as well as perform other tasks.

Figure 1:
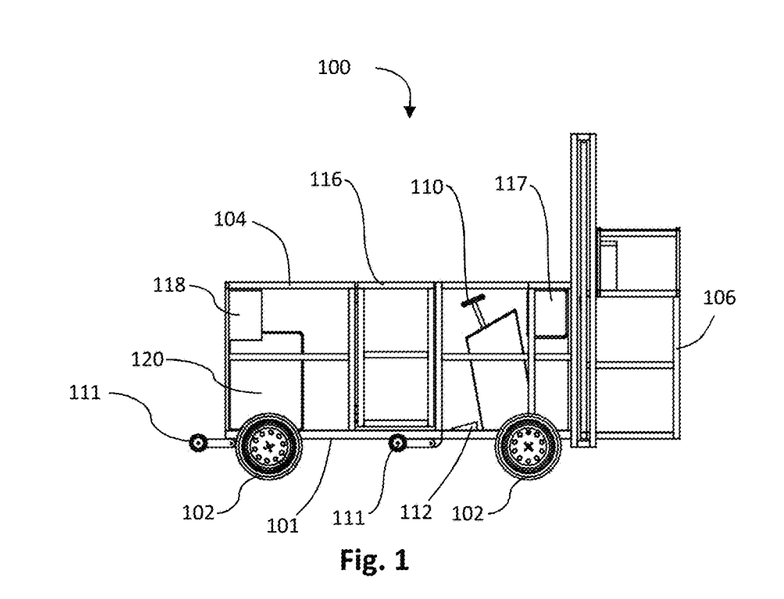
FIG. 1 illustrates a side elevation view of a roof vehicle.
Figure 2:
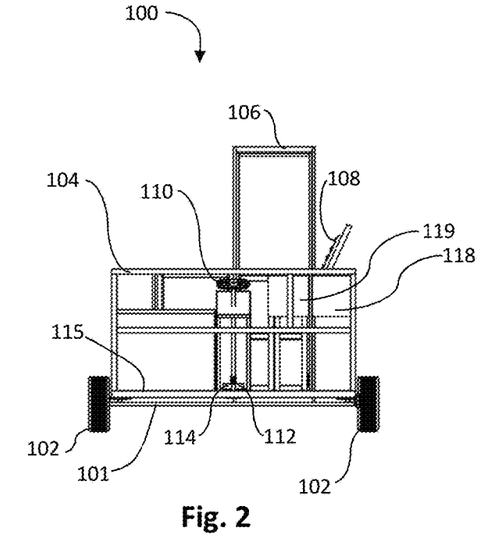
FIG. 2 illustrates is a rear elevation view of a roof vehicle.
Figure 3:
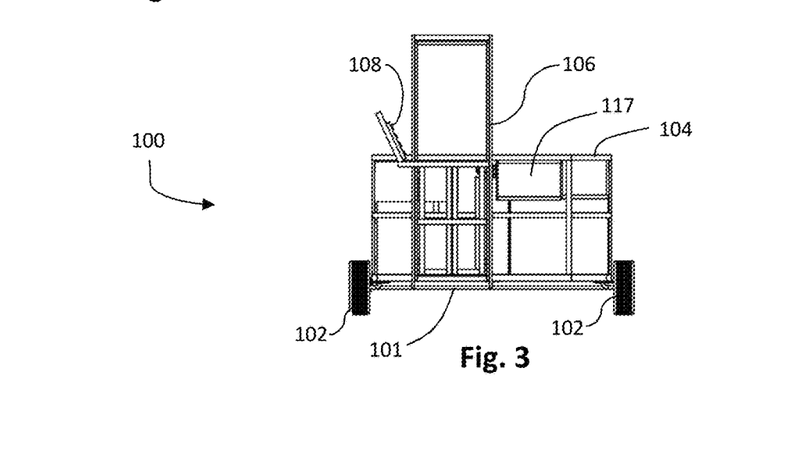
FIG. 3 illustrates front elevation view of a roof vehicle.
Figure 4:
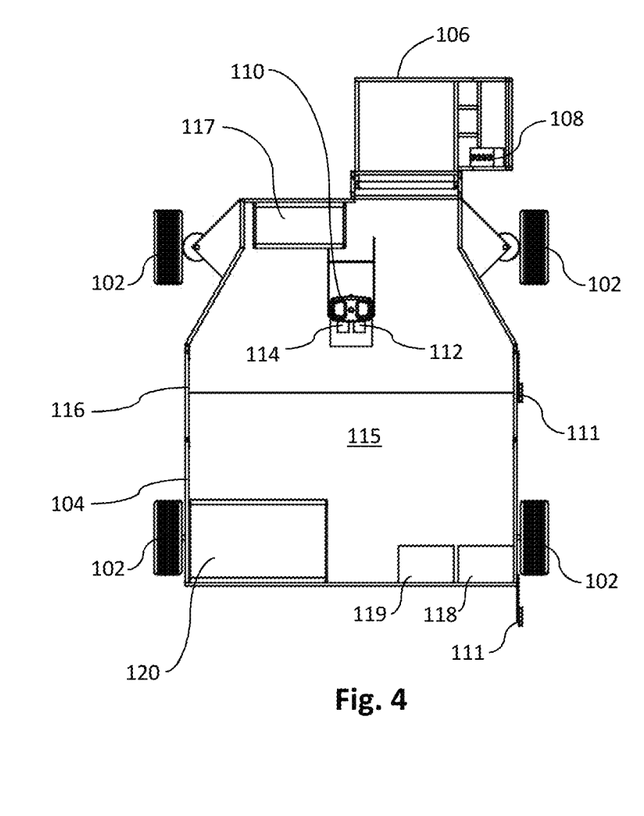
FIG. 4 illustrates a top plan view of a roof vehicle.
Figure 5:
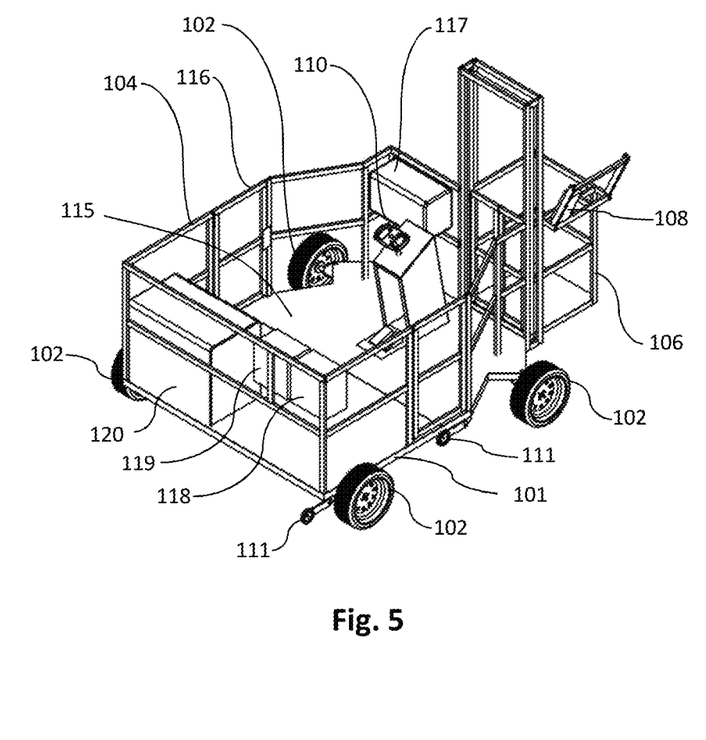
FIG. 5 illustrates a perspective view of a roof vehicle.
Figure 6:
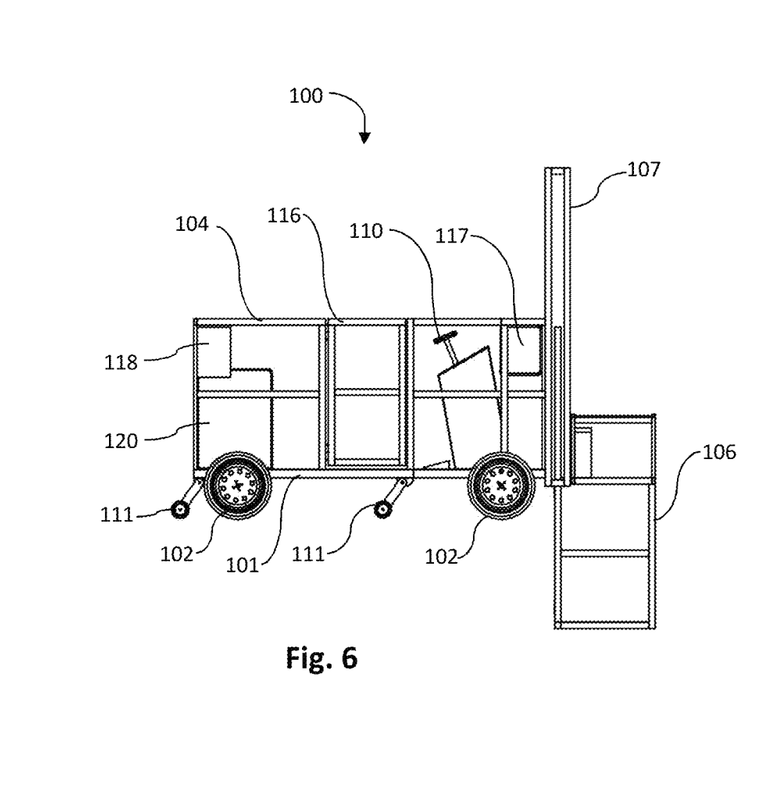
FIG. 6 illustrates a side elevation view of a roof vehicle with the man-basket lowered.
Figure 7:
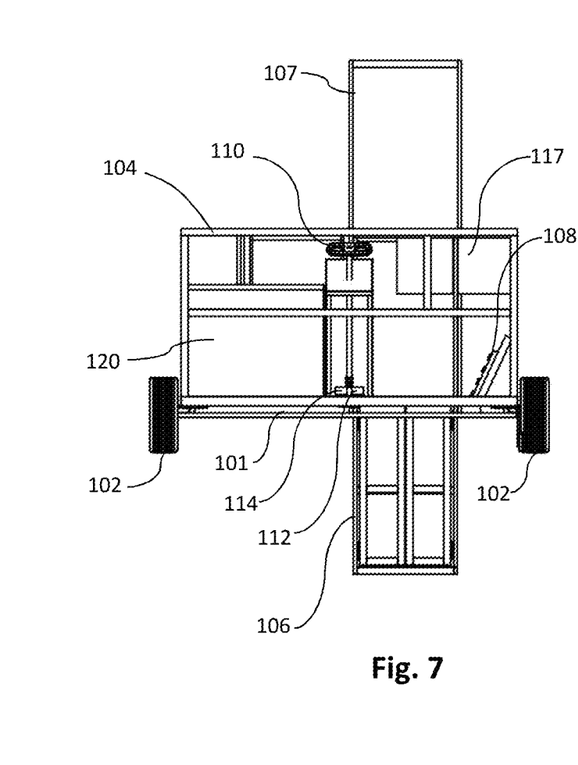
FIG. 7 illustrates a rear elevation view of a roof vehicle with the man-basket lowered.
Figure 8:
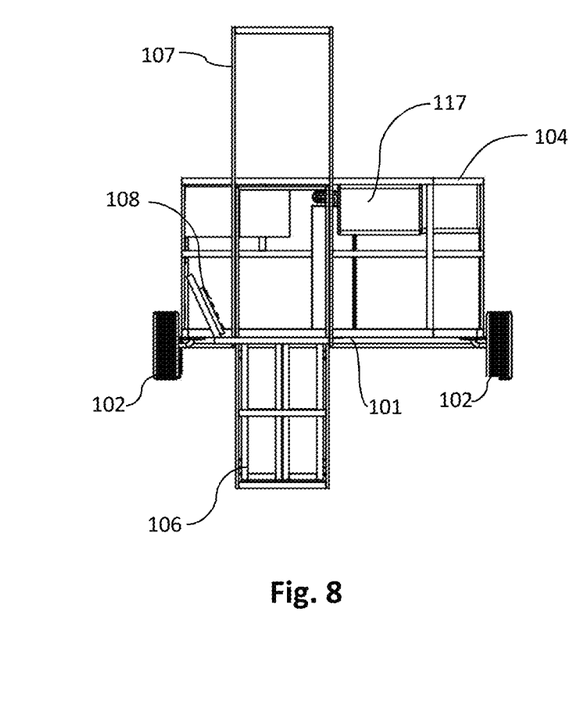
FIG. 8 illustrates a front elevation view of a roof vehicle with the man-basket lowered.
Figure 9:
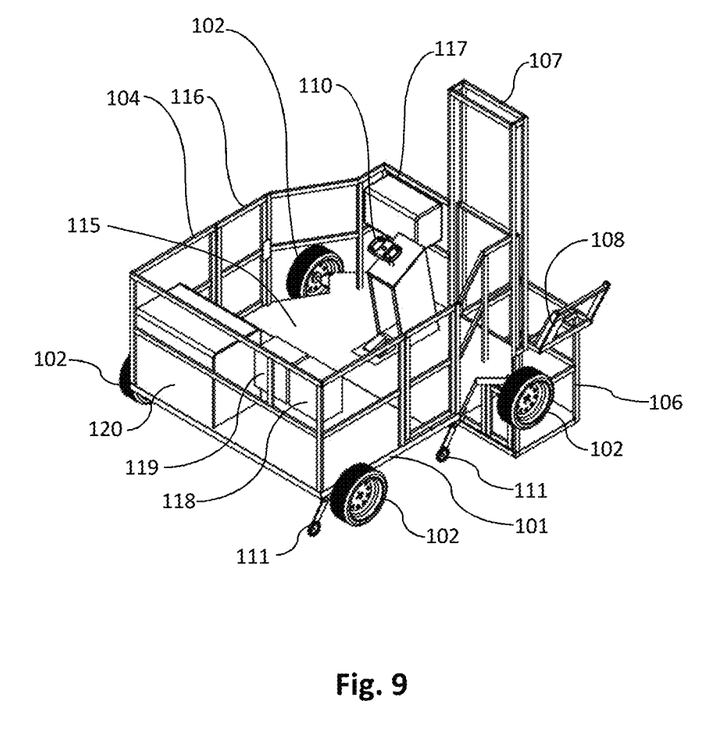
FIG. 9 illustrates a perspective view of a roof vehicle with the man-basket lowered.
Figure 10:
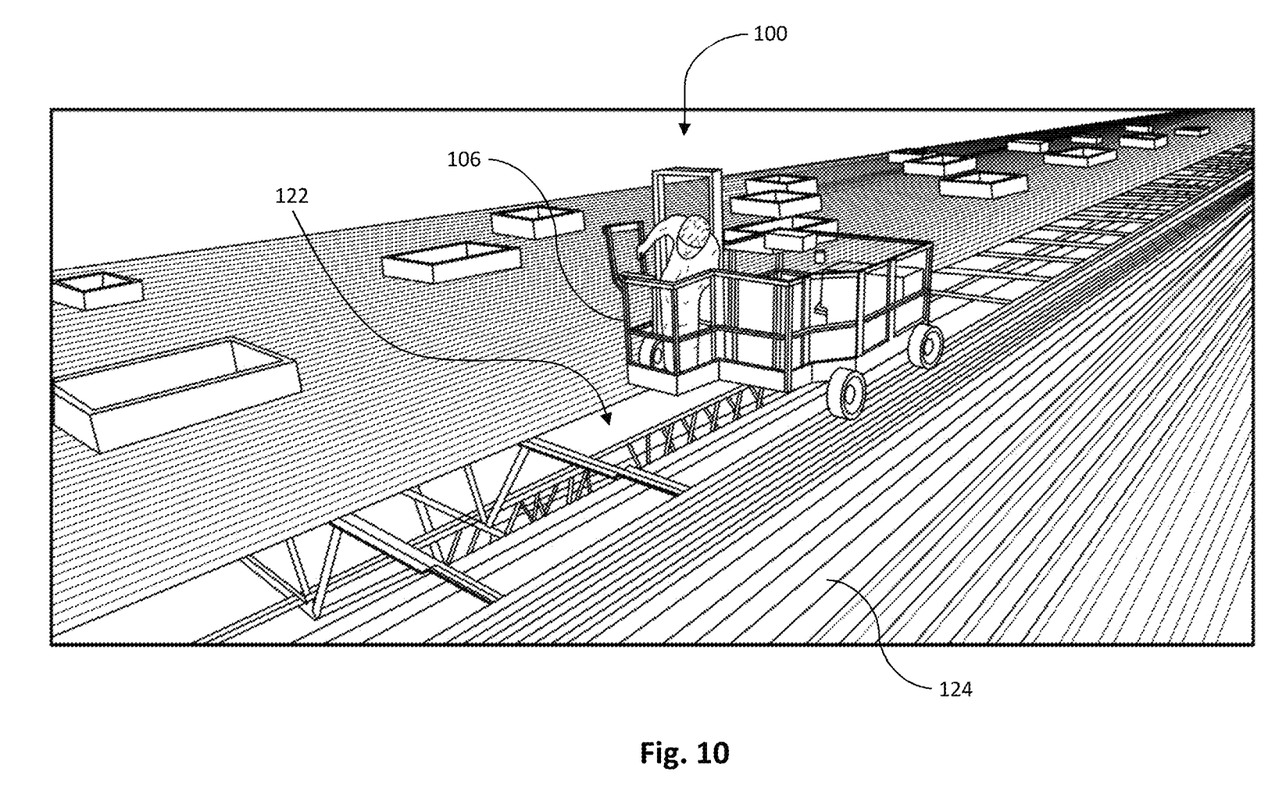
FIG. 10 illustrates a roof vehicle on a roof with the man-basket raised.
Figure 11:
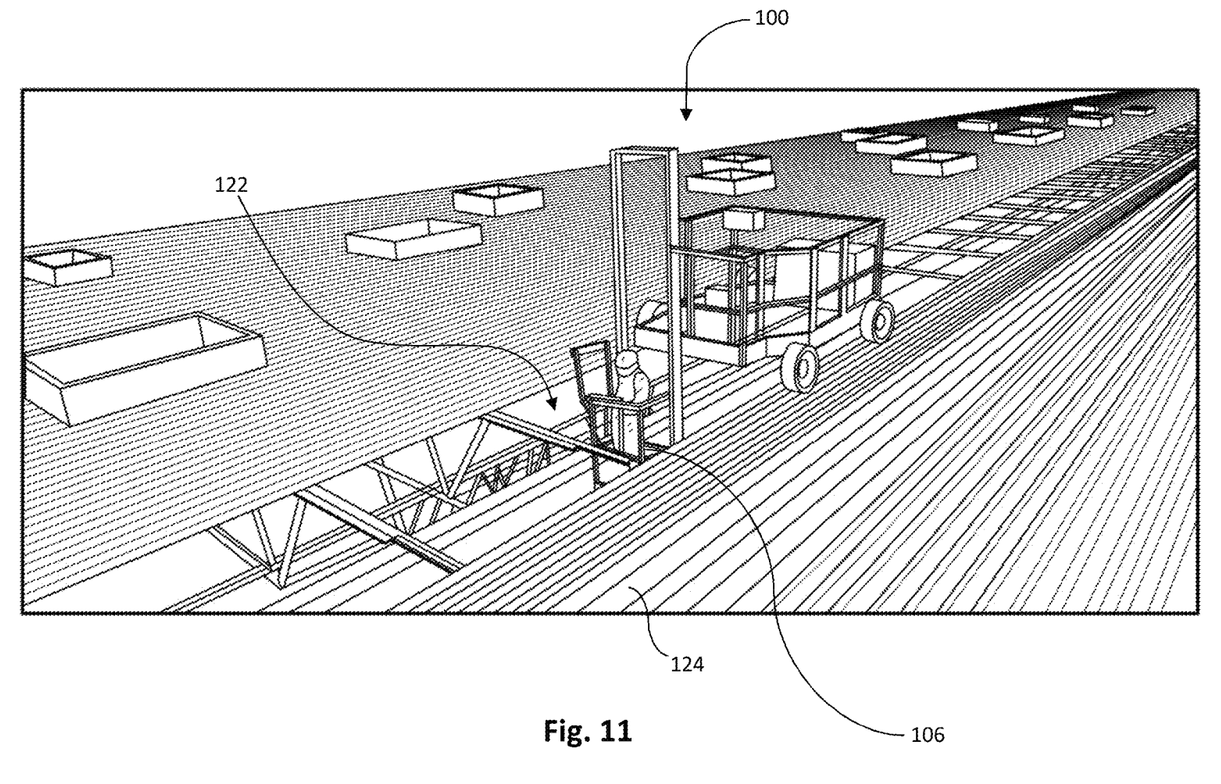
FIG. 11 illustrates a roof vehicle on a roof with the man-basket lowered.
Figure 12:
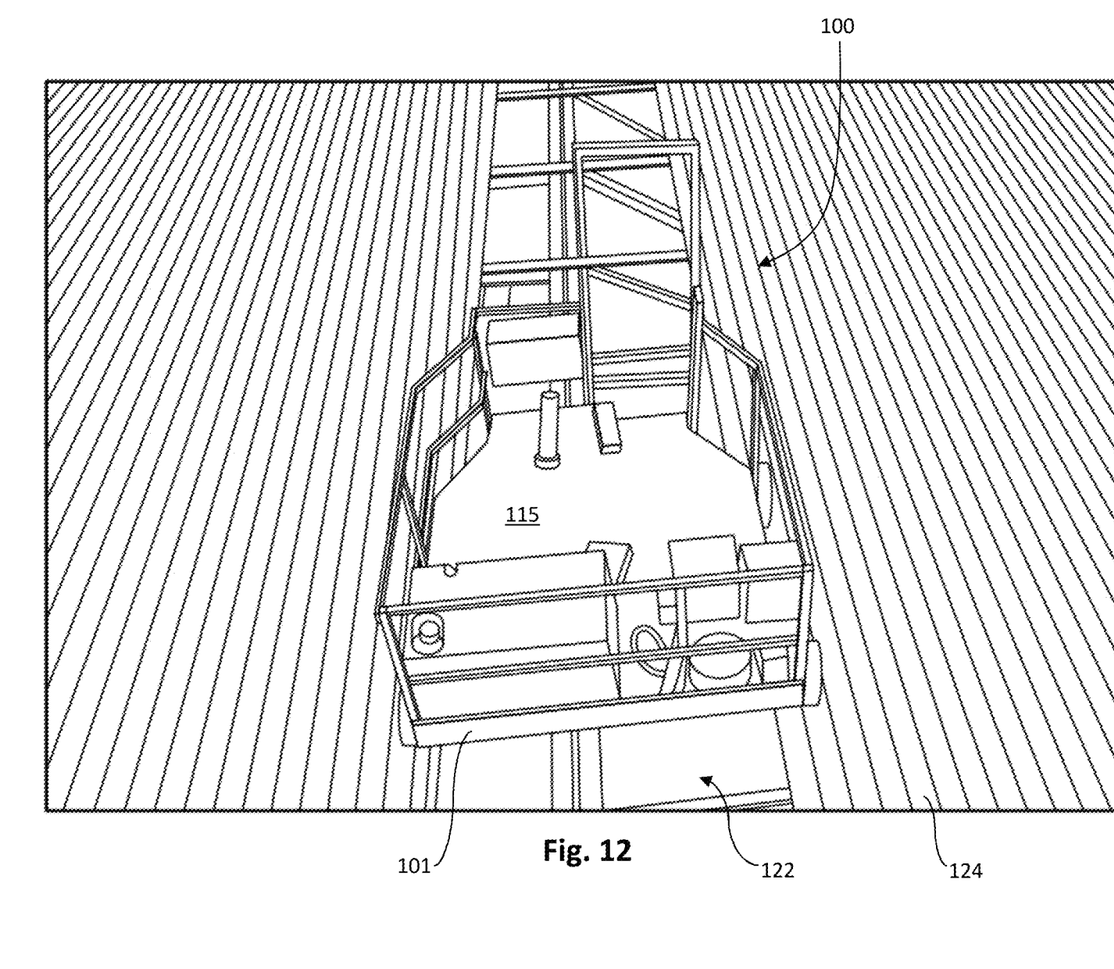
FIG. 12 illustrates a top view of a roof vehicle on a roof, spanning a gap in the roof.

For example, as shown in FIGS. 10-12, the roof vehicle 100 straddles an uncovered portion (a gap 122) of the roof 124 designated for welding access. Although not shown here, the guide wheels 111 may be lowered to prevent misalignment. The roof vehicle 100 situated as described allows a user to weld-stitch the joints of the building joists together to form the complete roof structure. As shown in FIG. 10, with the man-basket 106 raised, a user may drive the roof vehicle 100 via a control panel 108 (or via the steering wheel 110 and pedals 112, 114) to the desired welding position. For example, the control panel 108 may comprise a microcontroller for controlling one or more motors. Once in position, as best shown in FIG. 11, a user may lower the man-basket 106 so that a weld beneath the surface of the roof 124 may easily be completed—all without leaving the roof vehicle 100 (and in some instances, without leaving the man-basket 106) and without bending over at awkward and dangerous levels. Once the user is finished working in that location, the man-basket 106 may be raised so that the roof vehicle 100 may be driven to the next weld location. In one embodiment, as shown in FIG. 13 and discussed more fully later herein, the roof vehicle 200 rides parallel to the gap 122 rather than straddling it.

The roof vehicle 100 may be maneuverable using electric motors, gas-powered engines, or any other apparatus known in the art. Further, the wheels 102 may be individually powered using electric motors, or may be coupled to an axle and powered accordingly. Accordingly, in one non-limiting example, after the roof vehicle 100 has been hoisted onto a roof 124, a user would start the motor(s) and drive the roof vehicle 100 to a starting position on the roof 124, which, as shown in FIGS. 10-12, may be straddling a gap 122 in the roof 124, or, as shown in FIG. 13, may be alongside the gap 122. Once in position, the optional guide wheels 111 may be lowered. A user would then enter the man-basket 106 with welding equipment positioned so as to access the equipment from the man-basket 106. A user would then use the control panel 108 in the man-basket 106 to lower himself to the appropriate position to weld or otherwise secure the roof 124 to the structure. After completing the weld, the user would use the control panel 108 to raise the man-basket 106 and then drive the roof vehicle 100, using either the steering wheel 110 and pedals 112, 114 on the deck 115, or the control panel 108 in the man-basket 106, to the next welding position. The user would continue this process until all of the welding is completed. The user would then raise the guide wheels 111 and maneuver the roof vehicle 100 away from the gap 122 in the roof 124, where it may be removed from the roof 124 and lowered using a crane.

It should be appreciated that the roof vehicle's deck 115 allows for a variety of motors, welders, and other electrical equipment to be loaded onto the roof vehicle 100 for use. The roof vehicle 100 therefore allows the welding equipment to be easily transported thereon, so the user need not leave the roof vehicle 100 when moving from one joint to the next.

Figure 13:
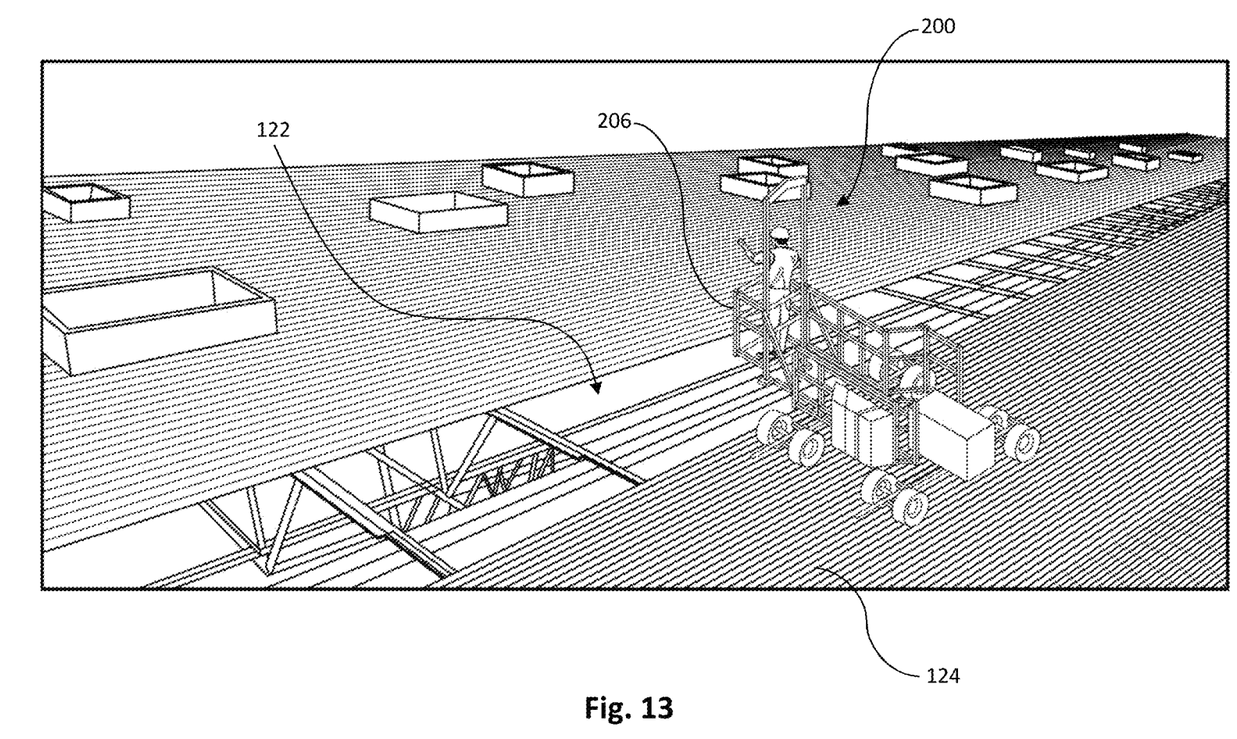
FIG. 13 illustrates a roof vehicle adjacent to a gap in the roof.
Figure 14:
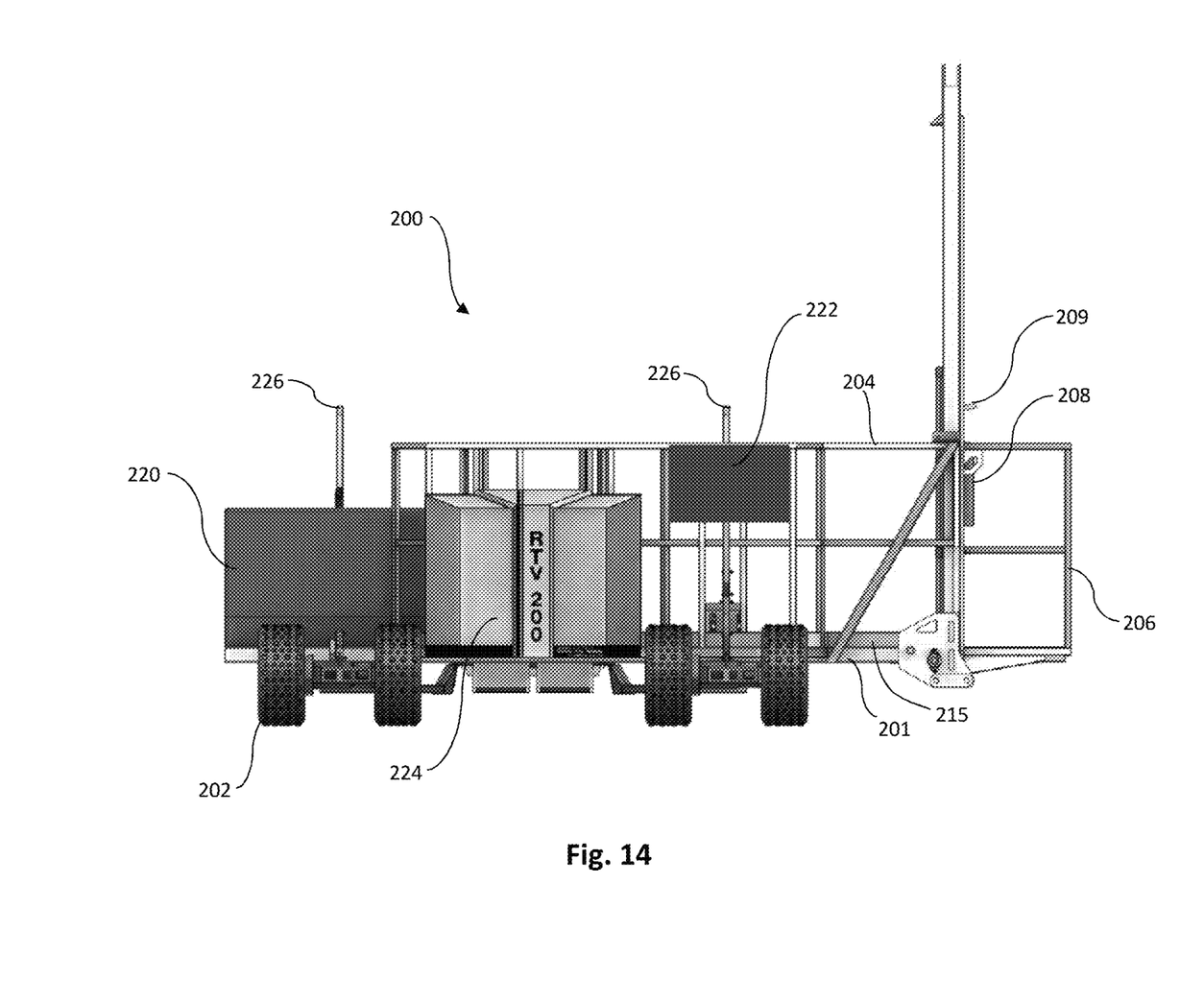
FIG. 14 illustrates a front elevation view of a roof vehicle.
Figure 15:
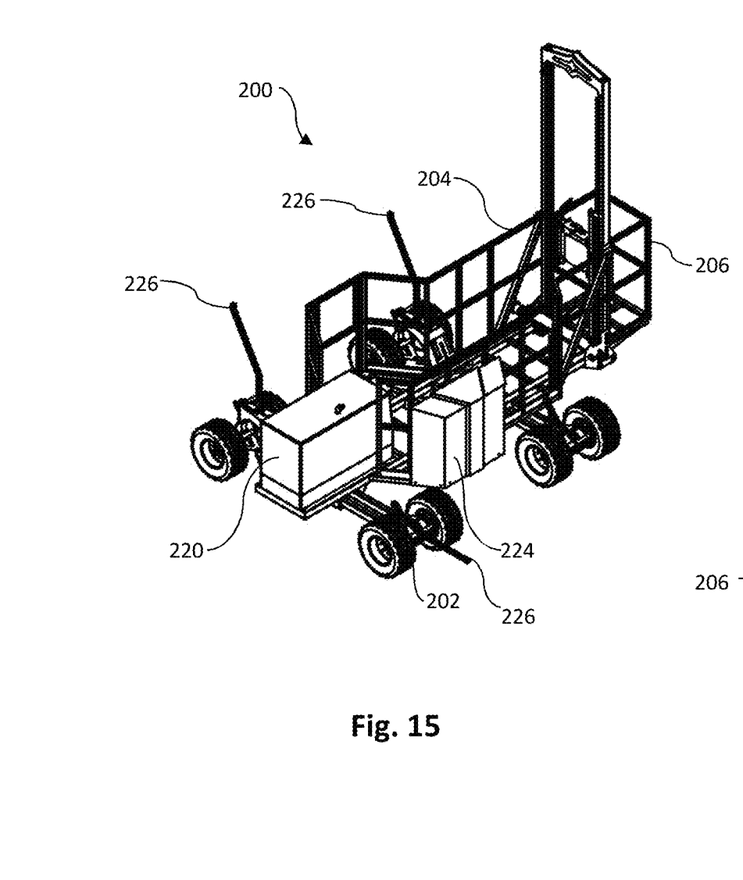
FIG. 15 illustrates a top perspective view of a roof vehicle.
Figure 16:
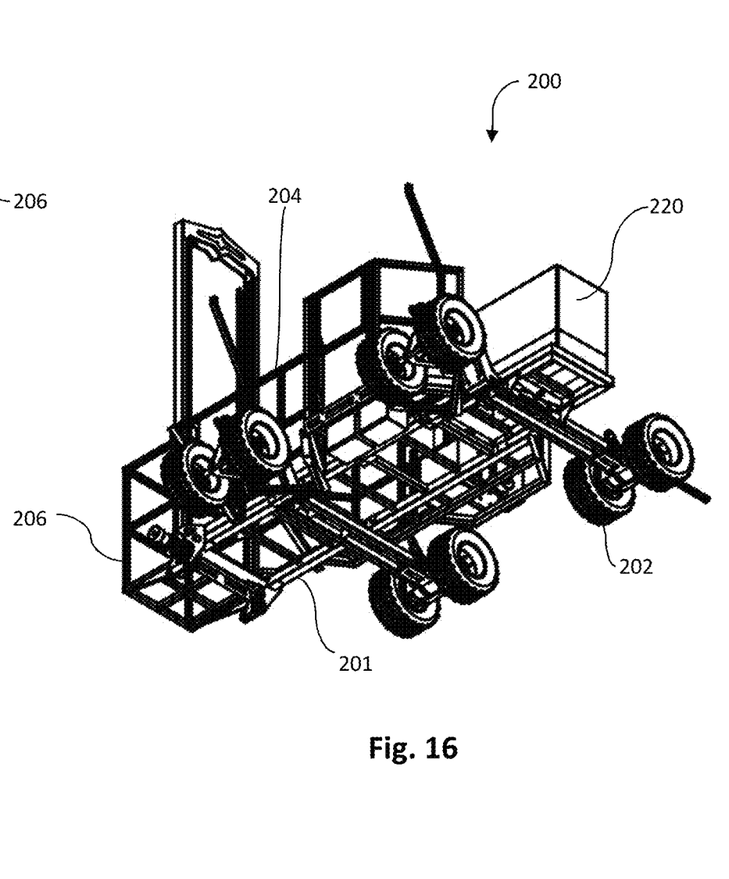
FIG. 16 illustrates a bottom perspective view of a roof vehicle.
Figure 17:
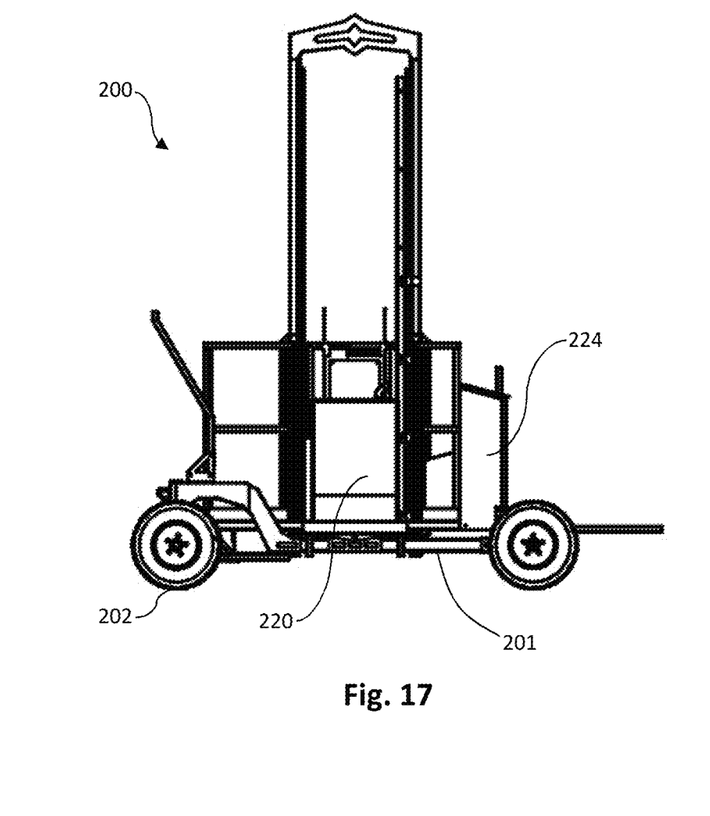
FIG. 17 illustrates a side elevation view of a roof vehicle.
Figure 18:
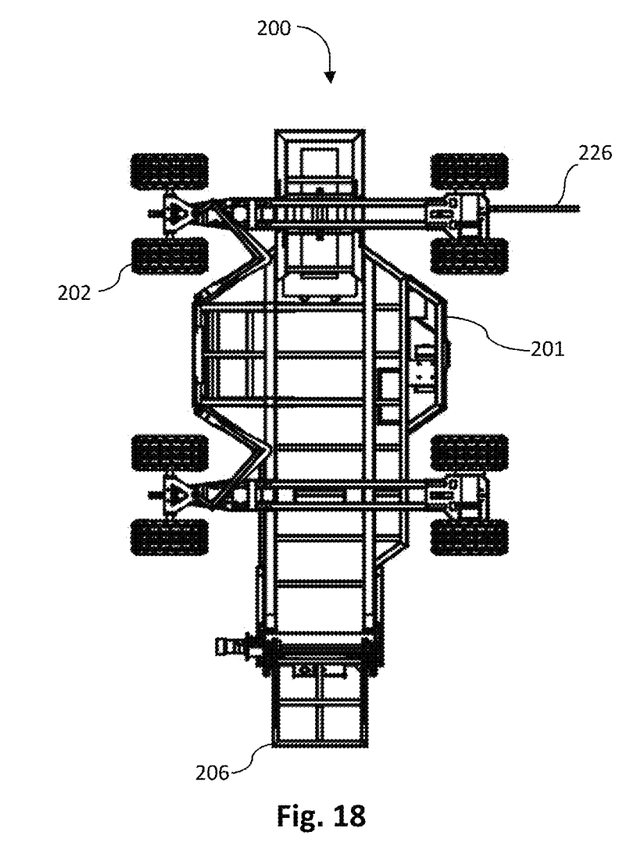
FIG. 18 illustrates a bottom plan view of a roof vehicle.

FIGS. 13-16 illustrate a roof vehicle 200 for securing roofing components to a structure. The roof vehicle 200 comprises a chassis 201 coupled to a plurality of wheels 202, a safety rail 204 extending around the circumference of a deck 215, a man-basket 206, and a welding generator 220. In this configuration, and as best shown in FIG. 13, the roof vehicle 200 travels alongside an open gap 122 in the roofing 124. The plurality of wide tires 202 provide for improved weight distribution, and in conjunction with the welding generator 220, aid in counterbalancing the roof vehicle 200. The man-basket 206 overhangs the gap 122 and is lowerable therein such that a user may easily perform the required welding without risk of falling and without having to awkwardly bend and twist while using welding equipment. In other words, the user may perform the weld from a comfortable and safe position inside of the man-basket 206, which is lowered beneath the surface of the roof 124. Once the weld is completed, the user in the man-basket 206 may raise the man-basket 206, such as by using a control panel 208 and/or drive lever 209. Additional accessories may be present, such as a wire feed 222 (e.g., Lincoln Electric Wire Feed LN-25 Pro). The man-basket 208 may be raised and lowered using systems and methods known in the art, such as hydraulics or any other suitable method of linear actuation. The deck 215 may further comprise optical safety sensors 226 to ensure safe operation at all times. Motors, hydraulics, and other components may be secured in a housing 224 coupled to the chassis 201.

For example, a user would start the electric motors and drive the roof vehicle 200 to a starting position on the roof 124, positioning the roof vehicle 200 proximal to a roof gap 122 with the man-basket 206 overhanging the roof gap 122. Thus, in this embodiment, the entire roof vehicle 200 is on one side of the roof gap 122. Once in position, a user would enter the man-basket 206 with welding equipment positioned so as to access the equipment from the man-basket 206. After having all equipment setup, including the electric wire feed 222, a user would then use the control panel 208 or lever 209 in the man-basket 206 to lower himself to the appropriate position beneath the roof and to an elevation lower than the wheels 202, and weld-stitch the joints of the building joists together to form the complete roof structure of the building. After completing the weld, the user would use the control panel 208 or lever 209 to raise the man-basket 206 into the raised position and would drive the roof vehicle 200, using the control panel 208, to the next welding position. The user would continue this process until all of the welding is completed. The user would then maneuver the roof vehicle 200 away from the gap 122 in the roof 124, where it may be removed from the roof 124 and lowered using a crane.

The deck 215 allows welding, and other, equipment to be easily transported on the roof vehicle 200, so the user need not leave roof vehicle 200 when moving from one roof worksite to the next. The roof vehicle 200 is designed to travel along the length of the corrugated sheathing. One or more guide wheels may also be included for tracking along one side of the open roof gap.

It will be appreciated that the configuration of the deck and its components may vary without departing herefrom. For example, in one embodiment, the safety railing 204 of the roof vehicle 200 may be placed around the entire circumference of the chassis 201, including the welding generator 220. In another embodiment, a weight adjusting system or apparatus may adjust for the weight of the man-basket 206, equipment, and/or the user. In other words, a weight-offset portion would adjust the weight farther away from the center if the man-basket 206 is heavy or has additional equipment, and would move closer to the center if the man-basket 206 is light, thus adding to the safety of the roof vehicle 200 by distributing weight evenly. This may be accomplished using microcontrollers and motors for moving the weight.

In one embodiment, a roof vehicle may further comprise platforms for mounting or placing pieces of equipment, a covering for equipment, risers or hydraulics for adjusting the height of the chassis or deck, and magnetic wheels and/or electromagnetically charged wheels to offset weight requirements and/or to help guide placement of items being attached to the underside of the roof.

Accordingly, it is appreciated from the foregoing disclosure that the roof vehicle solves the need for a method of easily transporting welding equipment while on a roof, while simultaneously improving the safety and efficiency of a user. It will also be appreciated that while welding joists is specifically discussed above, such use is not restrictive. Other situations where a user needs to be lowered to a position below that of the vehicle are contemplated herein, and such uses do not depart herefrom.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:
1. A roof vehicle, comprising:
   a chassis;
   a plurality of motor-driven wheels coupled to the chassis;
   a man-basket coupled to the chassis, the man-basket comprising a control panel for:
   a. moving the man basket on a y-axis, the man-basket configured to be lowerable on the y-axis into a gap in a roof and lowerable to an elevation beneath that of the motor-driven wheels;
   b. controlling the motor of each motor-driven wheel coupled to the chassis, allowing a user to control horizontal movement of the roof vehicle on the roof and to steer the roof vehicle from within the man-basket;
   a welding generator;
   a deck for transporting equipment;
   an optical safety sensor extending horizontally outwardly from the deck to ensure safe operation of the roof vehicle on the roof; and
   a power supply.
2. The roof vehicle of claim 1, further comprising a safety railing coupled to the chassis perimeter.
3. The roof vehicle of claim 1, further comprising a controller coupled to the motor-driven wheels, the controller configured to move the roof vehicle directionally based on user input.
4. The roof vehicle of claim 3, wherein the user input is inputted via a drive lever in the man-basket.
5. A roof vehicle, comprising:
   a chassis;

a plurality of motor-driven wheels coupled to the chassis;
a man-basket coupled to the chassis, the man-basket comprising a control panel for:
- a. moving the man basket on a y-axis, the man-basket configured to be lowerable on the y-axis into a gap in a roof and lowerable to an elevation beneath that of the motor-driven wheels;
- b. controlling the motor of each motor-driven wheel coupled to the chassis, allowing a user to control horizontal movement of the roof vehicle on the roof and to steer the roof vehicle from within the man-basket;

a welding generator; and
a safety sensor to ensure safe operation of the roof vehicle on the roof.

* * * * *